United States Patent
Orihara et al.

(10) Patent No.: US 12,160,432 B2
(45) Date of Patent: Dec. 3, 2024

(54) LOG ANALYSIS APPARATUS, LOG ANALYSIS METHOD, AND LOG ANALYSIS PROGRAM

(71) Applicant: NIPPON TELEGRAPH AND TELEPHONE CORPORATION, Tokyo (JP)

(72) Inventors: Shingo Orihara, Musashino (JP); Tohru Sato, Musashino (JP); Yohsuke Shimada, Musashino (JP); Yuta Iwaki, Musashino (JP); Yang Zhong, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 567 days.

(21) Appl. No.: 16/489,354

(22) PCT Filed: Feb. 19, 2018

(86) PCT No.: PCT/JP2018/005773
§ 371 (c)(1),
(2) Date: Aug. 28, 2019

(87) PCT Pub. No.: WO2018/159362
PCT Pub. Date: Sep. 7, 2018

(65) Prior Publication Data
US 2019/0387012 A1    Dec. 19, 2019

(30) Foreign Application Priority Data
Mar. 3, 2017    (JP) ................. 2017-041125

(51) Int. Cl.
*H04L 9/40*        (2022.01)
*G06N 20/00*       (2019.01)
*H04L 67/30*       (2022.01)

(52) U.S. Cl.
CPC ........ *H04L 63/1425* (2013.01); *G06N 20/00* (2019.01); *H04L 67/30* (2013.01)

(58) Field of Classification Search
CPC ..... H04L 63/1425; H04L 67/30; H04L 12/66; G06N 20/00; G06F 21/55
See application file for complete search history.

(56) References Cited

U.S. PATENT DOCUMENTS 7,441,429 B1 *  10/2008  Nucci ................. H04L 63/1416
                                                      709/224
7,716,340 B2 *   5/2010  Modrall ................. G06F 21/62
                                                      709/227

(Continued)

FOREIGN PATENT DOCUMENTS

JP    2010-152431 A    7/2010
JP    2013-232716 A    11/2013

(Continued)

OTHER PUBLICATIONS

International Search Report and Written Opinion mailed on May 22, 2018 for PCT/JP2018/005773 filed on Feb. 19, 2018, 7 pages including English Translation of the International Search Report.

*Primary Examiner* — Abu S Sholeman
(74) *Attorney, Agent, or Firm* — XSENSUS LLP

(57) ABSTRACT

A log analysis apparatus extracts a parameter from an access log under analysis, acquires a similarity by comparing the parameter with the parameter included in the profile stored in a profile storage unit, and determines an access in the access log under analysis as an attack when the similarity is lower than a threshold. The log analysis apparatus takes a tally of the number of different requesting user terminals, for each parameter, among the access logs under analysis including a parameter not found in the profile, or having a similarity lower than the threshold, and determines, when there is any parameter for which the number of such (Continued)

| SOURCE IP | DATE AND TIME | PATH | PARAMETER KEY | PARAMETER VALUE | CHARACTER CLASS SEQUENCE (PARAMETER VALUE AFTER ABSTRACTION) |
|---|---|---|---|---|---|
| 192.0.2.1 | 2016/11/24 18:00:10 | /search.php | p1 | value1 | [AL,NUM] |
| | | | p2 | value-2 | [AL,SYM,NUM] | different user terminals is equal to or higher than a threshold, to re-learn the parameter.

19 Claims, 18 Drawing Sheets

(56) References Cited

U.S. PATENT DOCUMENTS

| | | | | |
|---|---|---|---|---|
| 9,531,736 | B1* | 12/2016 | Torres | H04L 63/1441 |
| 9,639,453 | B2* | 5/2017 | Belur | G06F 11/368 |
| 2002/0099813 | A1* | 7/2002 | Winshell | G06F 16/9566 |
| | | | | 709/224 |
| 2006/0294588 | A1* | 12/2006 | Lahann | G06F 21/56 |
| | | | | 726/11 |
| 2007/0186282 | A1* | 8/2007 | Jenkins | H04L 63/1416 |
| | | | | 726/22 |
| 2008/0019302 | A1* | 1/2008 | Nagarajan | H04L 69/40 |
| | | | | 370/328 |
| 2008/0318616 | A1* | 12/2008 | Chipalkatti | H04W 12/086 |
| | | | | 455/550.1 |
| 2009/0076995 | A1* | 3/2009 | Uyama | G06Q 30/02 |
| | | | | 706/46 |
| 2010/0177752 | A1* | 7/2010 | Aggarwal | H04W 8/082 |
| | | | | 370/338 |
| 2011/0179467 | A1* | 7/2011 | Wei | H04L 63/1441 |
| | | | | 726/3 |
| 2013/0215888 | A1* | 8/2013 | Zhang | H04L 45/02 |
| | | | | 370/392 |
| 2014/0187177 | A1 | 7/2014 | Sridhara et al. | |
| 2017/0126724 | A1 | 5/2017 | Zhong et al. | |
| 2021/0314289 | A1* | 10/2021 | Chandrashekhar | H04L 45/04 |

FOREIGN PATENT DOCUMENTS

| | | |
|---|---|---|
| JP | 2016-505984 A | 2/2016 |
| WO | 2015/186662 A1 | 12/2015 |

* cited by examiner

FIG.2

| PATH: PARAMETER KEY | CHARACTER CLASS SEQUENCE | APPEARANCE COUNT |
|---|---|---|
| /path:key1 | [AL] | 1 |
| | [AL,NUM] | 2 |
| /path:key2 | [HEX] | 1 |
| /otherpath:key | [AL,SYM] | 2 |

FIG.3

| SOURCE IP | DATE AND TIME | REQUEST |
|---|---|---|
| 192.0.2.1 | 2016/11/24 18:00:00 | /index.html |
| 192.0.2.1 | 2016/11/24 18:00:10 | /search.php?p1=value1&p2=value-2 |
| 192.0.2.10 | 2016/11/24 18:01:05 | /index.html |
| 192.0.2.10 | 2016/11/24 18:02:00 | /login.php?id=MyID&pw=1234abc |
| ⋮ | ⋮ | ⋮ |

FIG.4

| SOURCE IP | DATE AND TIME | REQUEST |
|---|---|---|
| 192.0.2.1 | 2016/11/24 18:00:10 | /search.php?p1=value1&p2=value-2 |

⇩

| SOURCE IP | DATE AND TIME | PATH | PARAMETER KEY | PARAMETER VALUE |
|---|---|---|---|---|
| 192.0.2.1 | 2016/11/24 18:00:10 | /search.php | p1 | value1 |
| | | | p2 | value-2 |

FIG.5

| PRIORITY | CHARACTER CLASS | REGULAR EXPRESSION | DESCRIPTION |
|---|---|---|---|
| 1 | AL | [A-Za-z]+ | ALPHABETS |
| 2 | HEX | [0-9A-Fa-f]+ | HEXADECIMALS |
| 3 | NUM | [0-9]+ | NUMBERS |
| 4 | SYM | [-!#$%&@]+ | SYMBOLS |

FIG.6

| SOURCE IP | DATE AND TIME | PATH | PARAMETER KEY | PARAMETER VALUE | CHARACTER CLASS SEQUENCE (PARAMETER VALUE AFTER ABSTRACTION) |
|---|---|---|---|---|---|
| 192.0.2.1 | 2016/11/24 18:00:10 | /search.php | p1 | value1 | [AL,NUM] |
| | | | p2 | value-2 | [AL,SYM,NUM] |

LOG ANALYSIS APPARATUS, LOG ANALYSIS METHOD, AND LOG ANALYSIS PROGRAM

CROSS-REFERENCE TO RELATED APPLICATIONS

The present application is based on PCT filing PCT/JP2018/005773, filed Feb. 19, 2018, which claims priority to JP 2017-041125, filed Mar. 3, 2017, the entire contents of each are incorporated herein by reference.

FIELD

The present invention relates to a log analysis apparatus, a log analysis method, and a log analysis program.

BACKGROUND

Recently, the number of attacks to Web servers has increased dramatically as the Internet has come to be widely used. As a solution to such attacks, network intrusion detections prevention systems, such as an intrusion detection system (IDS), an intrusion prevention system (IPS), and a Web application firewall (WAF), have been known. However, because these systems detect attacks with a pattern using a black list or a signature file, such systems are often capable of detecting and protecting against known attacks only.

Addressing this issue, known as a technique for detecting unknown attacks is a technology for determining whether an access is an attack (not a normal access) by learning the features of parameter values from normal access requests that are addressed to a Web server, and comparing the features with those in an access request that is to be identified.

CITATION LIST

Patent Literature

Patent Literature 1: Japanese Laid-open Patent Publication No. 2013-232716

SUMMARY

Technical Problem

However, with the conventional technique for detecting unknown attacks, when the definition of the "normal access" changes due to reasons such as a change in the system specifications, the system needs to be manually re-trained. Therefore, the operations are often burdensome, and the system sometimes falls incapable of detecting the attacks highly accurately, disadvantageously.

Solution to Problem

A log analysis apparatus includes: a learning unit that extracts a parameter from an access log pertaining to a request issued from a user terminal to a server, that learns an appearance frequency of the parameter, and that stores a learning result in a storage unit as a profile; an analyzing unit that extracts a parameter from an access log under analysis, that acquires a similarity by comparing the parameter with the parameter included in the profile stored in the storage unit, and that determines an access in the access log under analysis as an attack when the similarity is lower than a threshold; and a re-learning requirement determining unit that takes a tally of number of different requesting user terminals, for each parameter, among access logs under analysis having a similarity lower than the threshold, and that determines, when there is any parameter for which the number of such different user terminals is equal to or higher than a threshold, to re-learn the parameter.

A log analysis method executed by a log analysis apparatus, the log analysis method includes: a learning process for extracting a parameter from an access log pertaining to a request issued from a user terminal to a server, learning an appearance frequency of the parameter, and storing a learning result in a storage unit as a profile; an analyzing process for extracting a parameter from an access log under analysis, acquiring a similarity by comparing the parameter with the parameter included in the profile stored in the storage unit, and determining an access in the access log under analysis as an attack when the similarity is lower than a threshold; and a re-learning requirement determining process for taking a tally of number of different requesting user terminals, for each parameter, among access logs under analysis having a similarity lower than the threshold, and determining, when there is any parameter for which the number of such different user terminals is equal to or higher than a threshold, to re-learn the parameter.

A log analysis program that causes a computer to execute: a learning step of extracting a parameter from an access log pertaining to a request issued from a user terminal to a server, learning an appearance frequency of the parameter, and storing a learning result in a storage unit as a profile; an analyzing step of extracting a parameter from an access log under analysis, acquiring a similarity by comparing the parameter with the parameter included in the profile stored in the storage unit, and determining an access in the access log under analysis as an attack when the similarity is lower than a threshold; and a re-learning requirement determining step of taking a tally of number of different requesting user terminals, for each parameter, among access logs under analysis having a similarity lower than the threshold, and determining, when there is any parameter for which the number of such different user terminals is equal to or higher than a threshold, to re-learn the parameter.

Advantageous Effects of Invention

According to the present invention, it is possible to reduce the burdens of the operations, and to detect unknown attacks highly accurately, advantageously.

BRIEF DESCRIPTION OF DRAWINGS

FIG. 2 is a schematic illustrating an example of information stored in a profile storage unit.

FIG. 3 is a schematic for illustrating a specific example of an access log.

FIG. 4 is a schematic for illustrating a parameter extraction process.

FIG. 5 is a schematic for illustrating some examples of a character class.

FIG. 6 is a schematic for illustrating an example of abstractions of parameter values.

DESCRIPTION OF EMBODIMENTS

Some embodiments of a log analysis apparatus, a log analysis method, and a log analysis program according to the present invention will now be explained in detail with reference to some drawings. These embodiments are, however, not intended to limit the scope of the log analysis apparatus, the log analysis method, and the log analysis program according to the present invention.

First Embodiment

In an embodiment below, a configuration of a log analysis apparatus 10 according to a first embodiment and the sequence of a process performed by the log analysis apparatus 10 will be explained one by one, and advantageous effects achieved by the first embodiment will be explained at last.

[Configuration of Log Analysis Apparatus]

Figure 1:
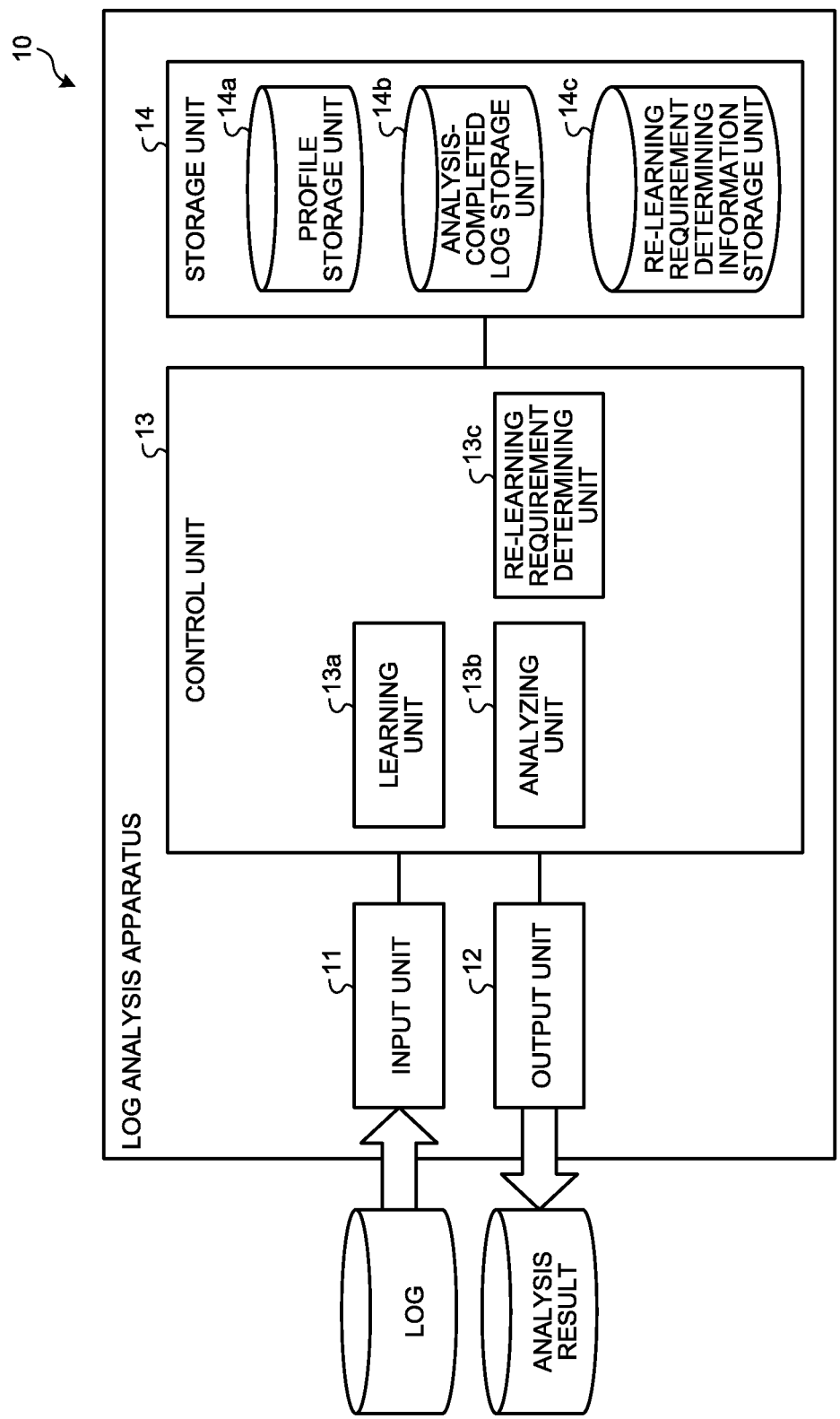
FIG. 1 is a schematic illustrating a general configuration of a log analysis apparatus according to a first embodiment.

To begin with, the configuration of the log analysis apparatus 10 will be explained with reference to FIG. 1. FIG. 1 is a schematic illustrating a general configuration of the log analysis apparatus according to the first embodiment. As illustrated in FIG. 1, the log analysis apparatus 10 includes an input unit 11, an output unit 12, a control unit 13, and a storage unit 14.

The input unit 11 is a device that receives operations for inputting various types of information, and receives an input of a log of accesses to a Web server, for example. The output unit 12 is a device that outputs various types of information, and outputs a result of an analyzing process, which will be described later, for example.

The storage unit 14 stores therein data and computer programs required in various processes executed by the control unit 13, and includes, as units that are particularly closely related to the present invention, a profile storage unit 14a, an analysis-completed log storage unit 14b, and a re-learning requirement determining information storage unit 14c. Examples of the storage unit 14 include a random access memory (RAM), a semiconductor memory device such as a flash memory, and a storage device such as a hard disk and an optical disc.

The profile storage unit 14a stores therein an appearance frequency of a parameter extracted from the access log. For example, the profile storage unit 14a stores therein "character class sequence" and "appearance count", in a manner associated with "path: parameter key", that is a combination of "path" and "parameter key", as a profile, as illustrated in FIG. 2. FIG. 2 is a schematic illustrating an example of the information stored in the profile storage unit.

The analysis-completed log storage unit 14b stores therein an access log for which an analysis has been completed by an analyzing unit 13b, which will be described later. The access log stored in the analysis-completed log storage unit 14b is data read when a learning unit 13a, which will be described later, performs re-learning.

The re-learning requirement determining information storage unit 14c stores therein a set of "source IP", "date and time", "path", and "parameter key" included in a request determined to have a parameter value not included in the profile, or to have no match in the profile, by the analyzing unit 13b, which will be described later.

The control unit 13 has an internal memory for storing therein computer programs specifying procedures of various processes and required data for executing various processes using the computer programs and the data, and includes, as units that are particularly closely related to the present invention, the learning unit 13a, the analyzing unit 13b, and a re-learning requirement determining unit 13c. The control unit 13 herein is an electronic circuit such as a central processing unit (CPU) or a micro-processing unit (MPU), or an integrated circuit such as an application specific integrated circuit (ASIC) or a field programmable gate array (FPGA).

The learning unit 13a extracts parameters from an access log pertaining to requests issued from a user terminal to a server, and learns the appearance frequencies of parameters, and stores therein the learning result in the profile storage unit 14a as a profile.

In the learning process, the learning unit 13a learns the features of the parameters from the access log input via the input unit 11, generates a profile, and stores the profile. The learning process will now be explained specifically. In the following explanation, descriptions are made assuming an example of a batch process in which a plurality of entries of an input log are fed at once, but the same process is applicable for a real-time process in which one entry is fed at a time. The system may be caused to perform one of the learning operation and an analyzing operation depending on an instruction given to the system, or the operation may be changed depending on the input, e.g., the learning operation is performed when input is a log stored in a training log storage area, and the analyzing operation is performed when input is a log stored in an analyzing log storage area.

To begin with, the learning unit 13a acquires a log for training via the input unit 11. Such a log for training is a log of accesses from user terminals to a Web server, and includes at least "source IP", "date and time", and "request", as illustrated in FIG. 3. FIG. 3 is a schematic for illustrating a specific example of the access log.

The learning unit 13a then initializes the profile with null data. The learning unit 13a then extracts various parameters from the log for training. For example, the learning unit 13a takes out one entry from the head of the received log for training, as illustrated in FIG. 4, parses the entry, and extracts "source IP", "date and time", and "request". The learning unit 13a then divides the "request" into a path part (the part preceding "?" in the "request" illustrated in FIG. 4) and a query string part (the part following "?" in the "request" illustrated in FIG. 4), and parses the query string part to acquire a parameter key (the part preceding "=" in FIG. 4) paired with a parameter value (the part following "=" in FIG. 4). FIG. 4 is a schematic for illustrating the parameter extraction process.

To explain using a specific example illustrated in FIG. 4, for example, the learning unit 13a divides the request "/search.php?p1=value1&p2=value-2" into a path part "/search.php" preceding "?", and a query string part "p1=value1&p2=value-2" following "?". The learning unit 13a then parses the query string part, and acquires the parameter key "p1" paired with the parameter value "value1", and the parameter key "p2" paired with the parameter value "value-2". If the request has no query string part, the learning unit 13a ignores the entry, and proceeds to the processing of the subsequent entry.

The learning unit 13a then extracts parameters from the access log, abstracts the extracted parameters, and learns the appearance frequencies of the abstracted parameters. For example, the learning unit 13a abstracts a parameter value into a sequence of character classes, e.g., a sequence of an alphabet class and a number class. The character class is expressed as a regular expression, for example. As illustrated in FIG. 5, the "priority " is set to each of the character classes, and the learning unit 13a is configured to abstract a parameter into a sequence class with the longest match from the head, and, if some character classes are found to match by the same length, the learning unit 13a abstracts the parameter into a sequence class to which a higher priority is assigned, that is, a sequence class assigned with a larger number. For example, "123" is abstracted to "NUM", but not "HEX". The learning unit 13a abstracts each parameter value into a character class, from the head of the parameter value, and converts the parameter value into a sequence of character classes, that is, into a character class sequence. The classes of the characters may be fed in advance, as a configuration file, for example. FIG. 5 is a schematic for illustrating an example of such character classes.

Some examples of a character class sequence resultant of the abstraction is illustrated in FIG. 6. FIG. 6 is a schematic for illustrating an example of abstractions of the parameter values. The character class sequence may be further abstracted into a character class set where the order and the redundancy of the character classes are omitted. For example, the character class sequences [AL, NUM, AL, SYM] and [SYM, NUM, AL] may be handled as the same character class set {AL, NUM, SYM}. Hereinafter, the term character class sequence represents, unless specified otherwise, either a character class sequence or a character class set.

Figure 7:
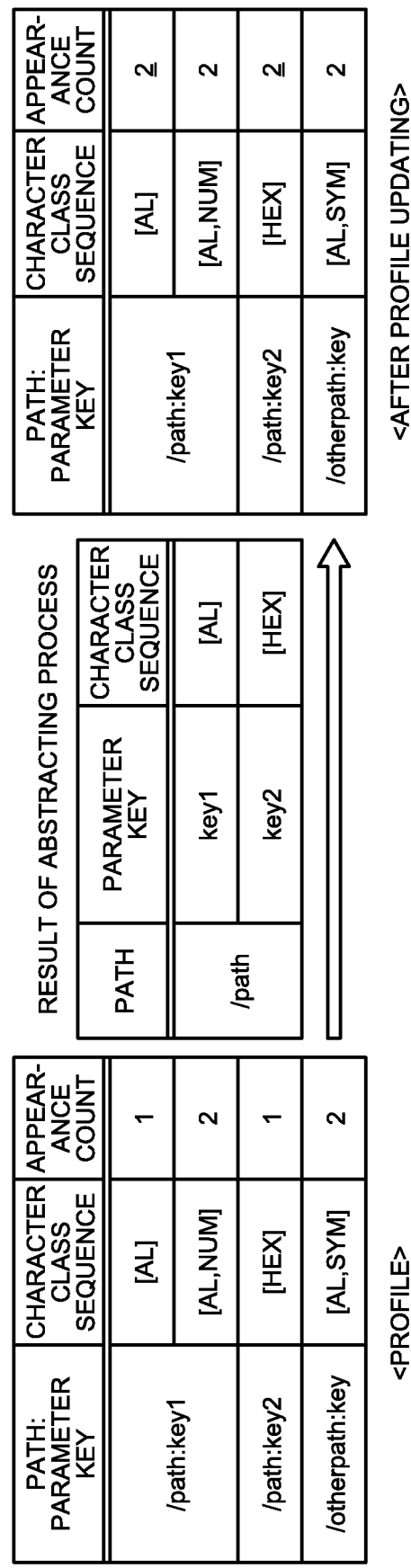
FIG. 7 is a schematic for illustrating an example of profile updating.

The learning unit 13a then updates the profile using the [path: parameter key] pair and the character class sequence acquired by the abstraction process described above. For example, if the character class sequence acquired by the abstraction process is found in the profile, as illustrated in FIG. 7, the learning unit 13a adds one to the appearance count. In the example illustrated in FIG. 7, the learning unit 13a updates the appearance counts to "2", by adding one to the appearance count "1" of "/path: key1" in [path: parameter key] with the character class sequence [AL], and by adding one to the appearance count "1" of "/path: key2" in [path: parameter key] with the character class sequence [HEX]. FIG. 7 is a schematic for illustrating an example of profile updating.

Figure 8:
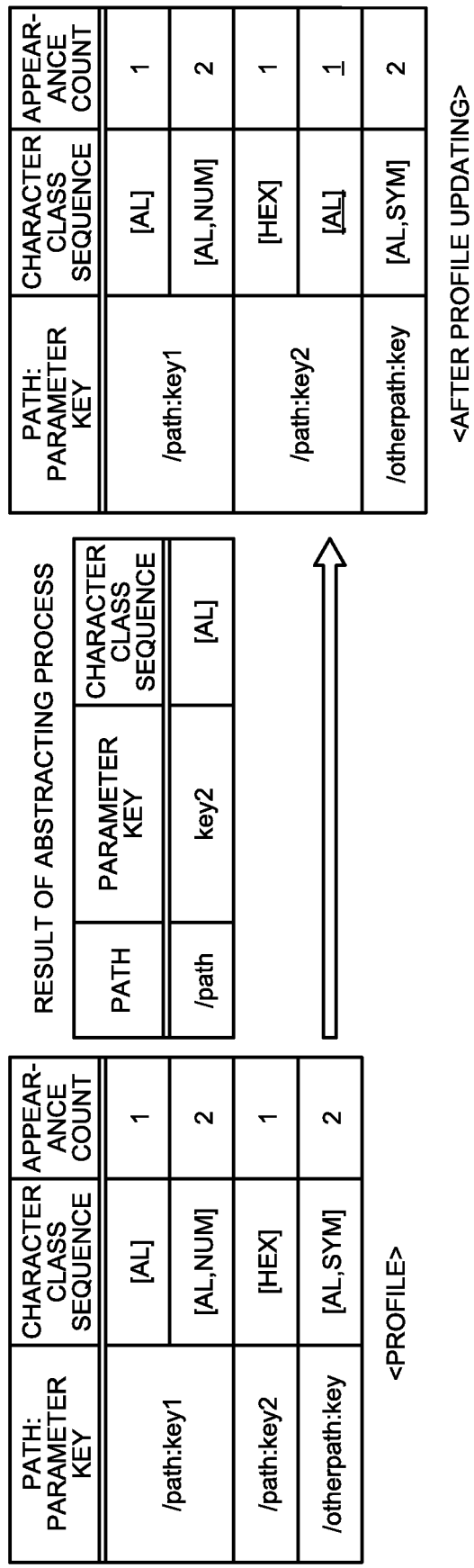
FIG. 8 is a schematic for illustrating an example of the profile updating.
Figure 9:
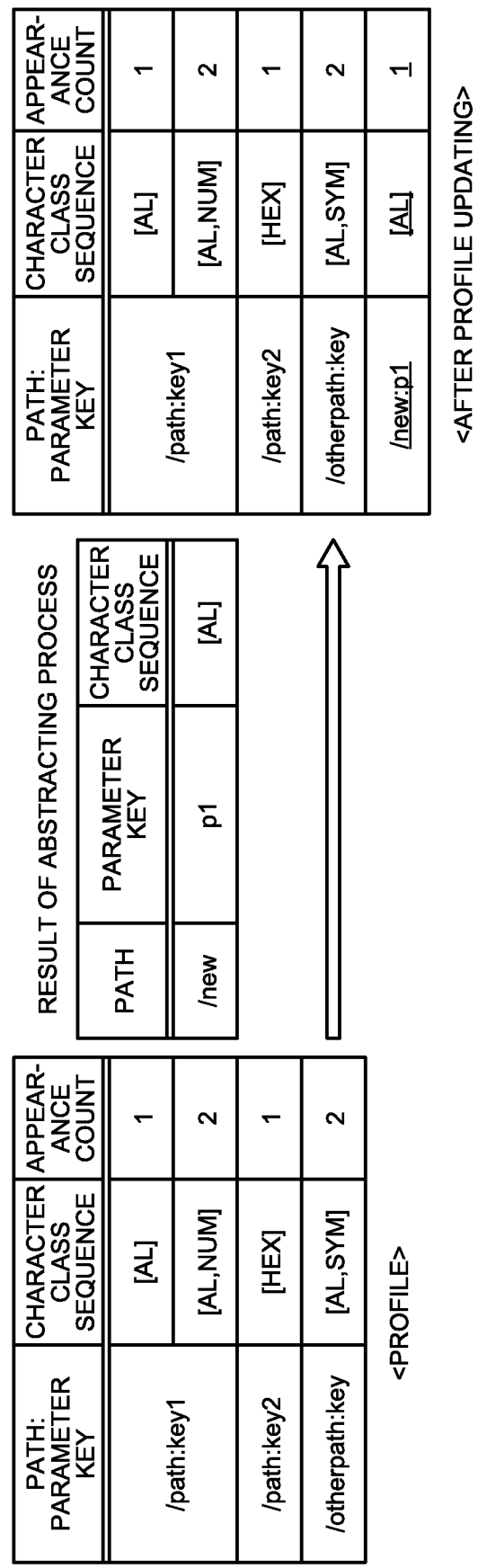
FIG. 9 is a schematic for illustrating an example of the profile updating.

If the character class sequence is not found in the profile, for example, as illustrated in FIG. 8, the learning unit 13a adds the character class sequence to the profile, with an appearance count of one. Furthermore, if no matching [path: parameter key] pair is found in the profile, for example, as illustrated in FIG. 9, the learning unit 13a adds the [path: parameter key] pair and the character class sequence to the profile, with an appearance count of one. FIG. 8 is a schematic for illustrating an example of profile updating. FIG. 9 is a schematic for illustrating an example of profile updating.

If there is any remaining entry to be learned, the learning unit 13a goes back to the parameter extraction process, and learns the remaining entry. A condition for ending the learning may be determined based on whether the log for learning has been completely learned, or determined by detecting that any new path, parameter key, or character class sequence has not appeared, and that the profile has remained unchanged, although the log has been read for a certain amount or more.

If the learning unit 13a determines that the learning has been completed, the learning unit 13a establishes the profile as definite. At this time, the learning unit 13a may calculate the appearance frequency of each parameter, and delete the parameters with an appearance frequency equal to or lower than a predetermined threshold from the profile. For example, the learning unit 13a may perform a normalization process of calculating the rate at which each character class sequence has appeared, for each of the [path: parameter key] pairs, and deleting a pair appearing at low frequencies from the profile, rendering the pair as a rare case, for example. The learning unit 13a then stores the profile established as definite in the profile storage unit 14a. In an environment where the types of parameter values that are passed are limited, the process of abstracting the parameter values may be omitted, and the parameter values themselves may be stored as a profile.

The analyzing unit 13b extracts parameters from an access log under analysis, and acquires a similarity by comparing the parameters with those included in the profile stored in the profile storage unit 14a. If the similarity is lower than a threshold, the analyzing unit 13b determines that the access included in the access log under analysis is an attack.

In the analyzing process, the analyzing unit 13b compares the features of the parameters acquired from the log for analysis input via the input unit 11, with those in the profile, and keeps comparing the parameters until an access with an anomaly feature is determined as an attack. The analyzing process will now be explained specifically. To begin with, the analyzing unit 13b acquires a log for analysis via the input unit 11. Such a log is a log of accesses to a Web server, in the same manner as the log for training, and includes at least "source IP", "date and time", and "request".

The analyzing unit 13b then reads the profile from the profile storage unit 14a. The analyzing unit 13b then takes out one entry from the head of the received log for analysis, parses the entry, and extracts the source IP, the date and time, and the request. The analyzing unit 13b then divides the request into a path part and a query string part, parses the query string part, and acquires a parameter key paired with a parameter value. The log for analysis for which the parsing has been completed is stored in an analysis-completed log storage unit 14b. The analyzing unit 13b then abstracts the parameter value into a character class sequence, e.g., a sequence of an alphabet class and a number class.

The analyzing unit 13b then compares the character class sequences resultant of the abstraction with the profile, and extracts a dissimilar character class sequence as an attack. Available as criteria for comparing the similarity, not only the exact match between the character class sequences may be used, but it is also possible to compare a ratio of the common part or the length of the longest common subsequence (LCS) between the character class sequences with the length of the character class sequence.

Figure 10:
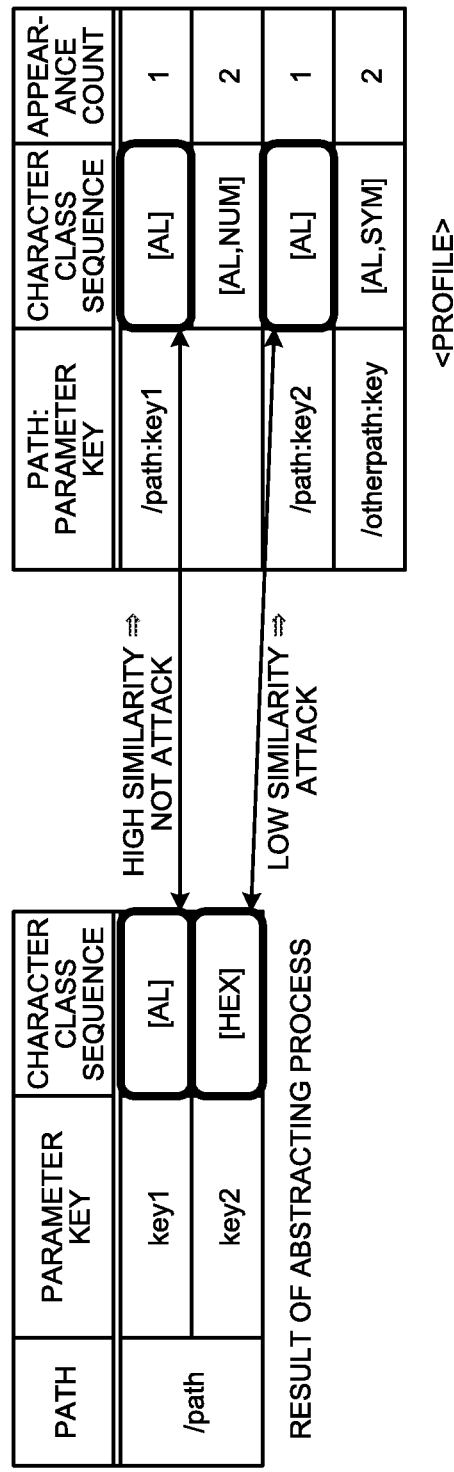
FIG. 10 is a schematic for illustrating an example of a similarity comparing process.

An example of the similarity comparing process will now be explained with reference to FIG. 10, FIG. 10 is a schematic for illustrating an example of the similarity comparing process. As illustrated in FIG. 10, when the character class "AL" corresponding to the path "/path" and the parameter key "key1" included in the access log under analysis is compared with the character class sequence "AL" corresponding to "/path: key1" found in [path: parameter key] in the profile, because these character class sequences match as being "AL", the analyzing unit 13b determines that the similarity is equal to or higher than the threshold, and determines that this access included in the access log under analysis is a "non-attack".

By contrast, when the character class "HEX" corresponding to the path "/path" and the parameter key "key2" included in the access log under analysis is compared with the character class sequence "AL" corresponding to "/path: key2" included in [path: parameter key] in the profile, because these character class sequences do not match, as being "HEX" and "AL", the analyzing unit 13b determines that the similarity is lower than the threshold, and that the access in the access log under analysis is an "attack".

If no match is found in [path: parameter key] included in the profile, or if it is determined that the similarity between the character class sequence is low in the similarity comparing process, the analyzing unit 13b stores the set of [source IP, date and time, path, parameter key] included in the entry currently being processed, in the re-learning requirement determining information storage unit 14c, as a piece of re-learning requirement determining information.

If there is some remaining entry to be analyzed, the analyzing unit 13b takes out one entry from the head of the input log for training, goes back to the process of parsing and extracting the source IP, the date and time, and the request, and repeats the process described above.

If there is no more entry to be analyzed, the analyzing unit 13b outputs the analysis result, and ends the process. The analysis result to be output includes the sets of source IP, date and time, and request acquired from the log under analysis, the pairs of parameter key and parameter value acquired by parsing, and determination results acquired by the similarity comparison, e.g., determinations as to whether an access is an "attack" or a "non-attack", for example. When the log is being fed in real time, one entry at a time, instead of being fed as a batch, the analysis result may be output every time the analysis of the one entry is completed.

Among the access log entries having been analyzed, those with parameters finding no match in [path: parameter key] included in the profile, or those with a similarity lower than the threshold, as a result of the similarity comparing process executed by the analyzing unit 13b, the re-learning requirement determining unit 13c takes a tally of the number of requesting user terminals, for each of such parameters. If there is any parameter for which the number of such different user terminals is equal to or higher than a threshold, the re-learning requirement determining unit 13c determines that the parameter is to be re-learned.

A process of determining whether the re-learning is required will now be explained specifically. To begin with, the re-learning requirement determining unit 13c acquires the re-learning requirement determining information. Specifically, the re-learning requirement determining unit 13c acquires the re-learning requirement determining information having been updated in the analyzing process ([source IP, date and time, path, parameter key] of a request with no matching parameter values in the profile, or a request with parameter values having a similarity lower than the threshold) from the re-learning requirement determining information storage unit 14c.

When many users have transmitted the parameter values not found in the profile, or those exhibiting a similarity lower than the threshold, continuously, the re-learning requirement determining unit 13c determines that such accesses are resultant of a specification change in the Web application, instead of attacks. In order to confirm that such parameters are being transmitted continuously from many users, the re-learning requirement determining unit 13c takes a tally of the pieces of re-learning requirement determining information.

Specifically, the re-learning requirement determining unit 13c takes a tally of the number of different source IPs, for each [path: parameter key] pair included in the re-learning requirement determining information corresponding to a certain time period. If the number of different source IPs is equal to or higher than a threshold, the re-learning requirement determining unit 13c determines that the re-learning is required. To determine continuity, it is also possible to include a process for narrowing down the source IPs for which a tally is taken, to those issuing a plurality of requests at a time interval shorter than a threshold over some time period. If it is determined that the re-learning is required, the re-learning requirement determining unit 13c instructs the learning unit 13a to re-learn the [path: parameter key] pair. After the process of determining whether the re-learning is required, the re-learning requirement determining information may be discarded.

The re-learning process performed by the learning unit 13a receiving a re-learning instruction from the re-learning requirement determining unit 13c will now be explained. Upon receiving a re-learning instruction from the re-learning requirement determining unit 13c, the learning unit 13a executes the re-learning and profile updating. An explanation of the re-learning process will be omitted, because the re-learning process is the same as the learning process except for the following (1) to (3). (1) At the step of acquiring the log for training, the learning unit 13a acquires the analysis-completed log that is stored in the analysis-completed log storage unit 14b, instead of acquiring the log for training from the input unit 11. (2) At the step of initializing the profile, the learning unit 13a acquires an existing profile from the profile storage unit 14a, instead of initializing the profile. When the learning is started from zero, instead of learning by making additions to the existing profile, only the [path: parameter key] pair to be re-learned may be initialized (the appearance count may be set to 0). (3) The learning unit 13a performs the process subsequent to the parsing only to the [path: parameter key] pair that is the target of re-learning. The re-learning requirement determining process may be performed every time the analysis is completed, or may be performed for a several analyses. Because the analysis-completed log is no longer necessary after it is determined whether the re-learning is required, the analysis-completed log may then be deleted automatically. In this manner, the capacity of the storage unit 14 can be reduced.

[One Example of Process Performed by Log Analysis Apparatus]

Figure 11:
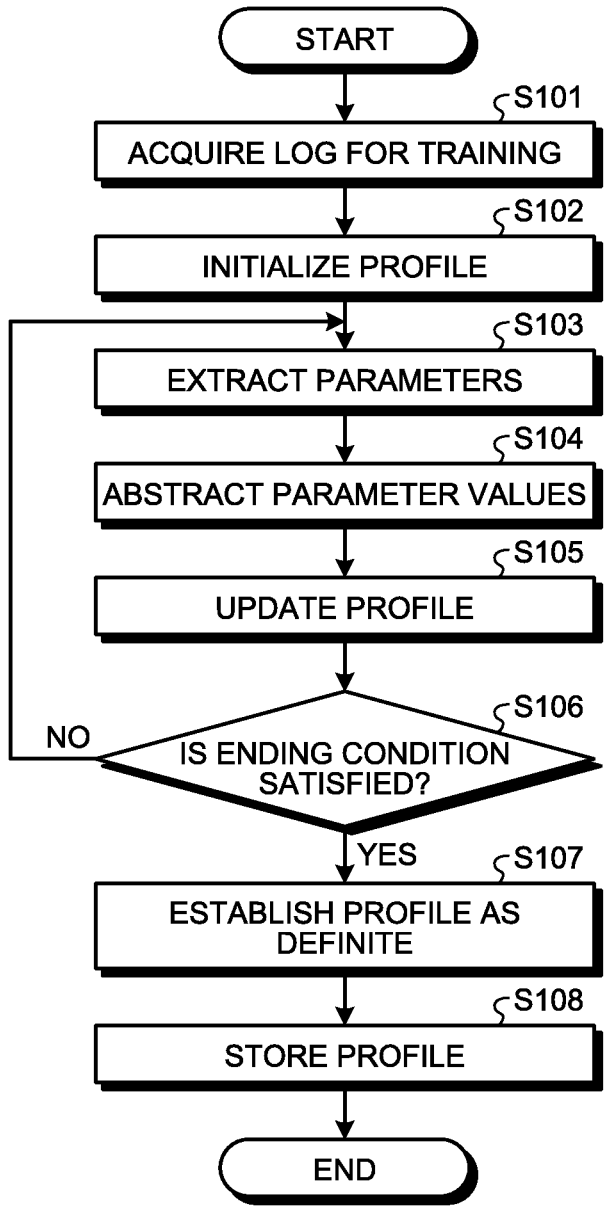
FIG. 11 is a flowchart illustrating the sequence of a learning process performed by the log analysis apparatus according to the first embodiment.
Figure 12:
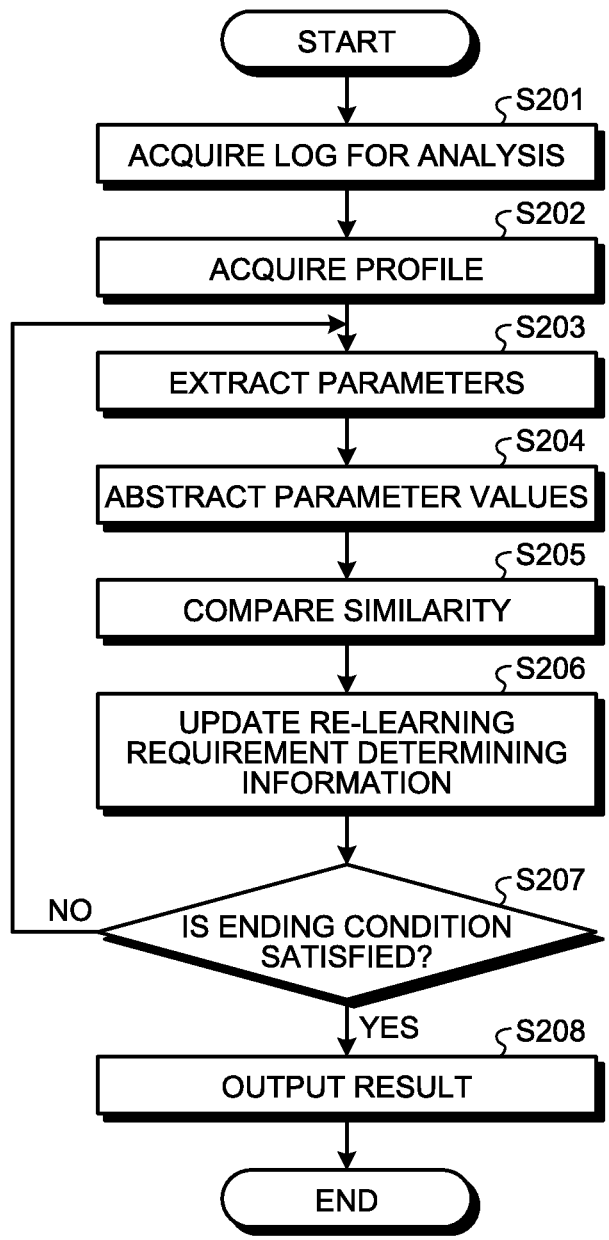
FIG. 12 is a flowchart illustrating the sequence of an analyzing process performed by the log analysis apparatus according to the first embodiment.
Figure 13:
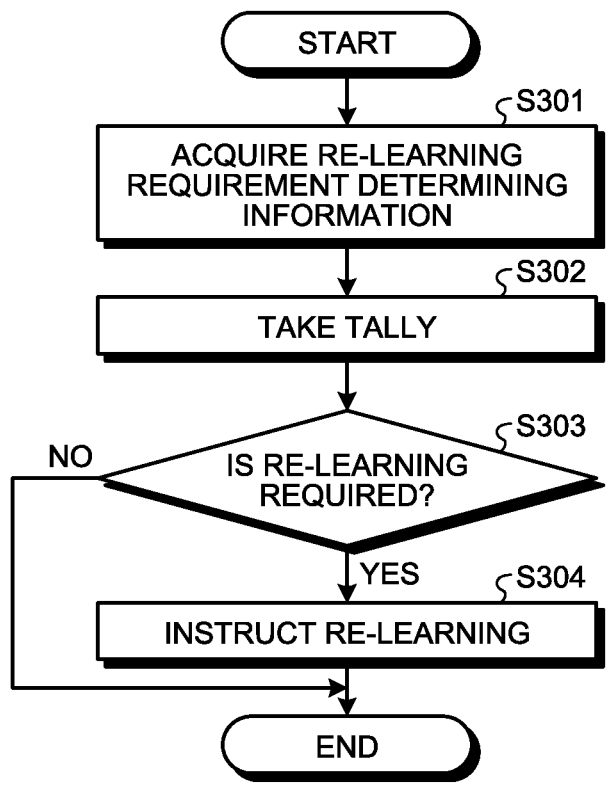
FIG. 13 is a flowchart illustrating the sequence of a re-learning requirement determining process performed by the log analysis apparatus according to the first embodiment.

The sequence of a process performed by the log analysis apparatus 10 will now be explained with reference to FIGS. 11 to 13. FIG. 11 is a flowchart illustrating the sequence of the learning process performed by the log analysis apparatus according to the first embodiment. FIG. 12 is a flowchart illustrating the sequence of the analyzing process performed by the log analysis apparatus according to the first embodiment. FIG. 13 is a flowchart illustrating the sequence of the re-learning requirement determining process performed by the log analysis apparatus according to the first embodiment.

To begin with, the sequence of the learning process performed by the log analysis apparatus 10 will be explained with reference to FIG. 11. As illustrated in FIG. 11, the learning unit 13a included in the log analysis apparatus 10 acquires a log for training via the input unit 11 (Step S101). The learning unit 13a then initializes the profile with null data (Step S102).

The learning unit 13a then extracts various parameters from the log for training (Step S103). For example, the learning unit 13a takes out one entry from the head of the input log for training, parses the entry, and extracts "source IP", "date and time", and "request". The learning unit 13a also divides the "request" into a path part (the part preceding "?" in FIG. 4) and a query string part (the part following "?" in FIG. 4), and parses the query string part to acquire a parameter key paired with a parameter value.

The learning unit 13a then extracts the parameters from the access log, and abstracts the extracted parameters (Step S104). For example, the learning unit 13a abstracts a parameter value, into a sequence of character classes, e.g., a sequence of an alphabet class and a number class. The learning unit 13a then learns the appearance frequency of the abstracted parameter, and updates the profile (Step S105). For example, if the character class sequence resultant of the abstraction process is found in the profile, the learning unit 13a adds one to the appearance count.

The learning unit 13a then determines whether the condition for ending the learning process has been satisfied (Step S106). As a result of this, if the learning unit 13a determines that the condition for ending has not been satisfied yet (NO at Step S106), and the control is returned to the process at Step S103. In other words, if there is any remaining access log entry to be learned, for example, the learning unit 13a goes back to the parameter extraction process, and learns the remaining log. The condition for ending the learning may be established based on whether the log for learning has been completely learned, or determined by detecting that any new path, parameter key, or character class sequence has not appeared, and that the profile has remained unchanged, although the log has been read for a certain amount or more.

If it is determined that the condition for ending has been satisfied (YES at Step S106), the learning unit 13a establishes the profile as definite (Step S107). At this time, the learning unit 13a may calculate the appearance frequency of each parameter, and delete the parameters with an appearance frequency equal to or lower than a predetermined threshold from the profile. For example, the learning unit 13a may perform a normalization process of calculating a rate at which each character class sequence has appeared, for each [path: parameter key] pair, and deleting a pair appearing at a low frequency from the profile, rendering the pair as a rare case, for example. The learning unit 13a then stores the profile established as definite in the profile storage unit 14a (Step S108).

The sequence of the analyzing process performed by the log analysis apparatus will now be explained with reference to FIG. 12. As illustrated in FIG. 12, the analyzing unit 13b acquires a log for analysis via the input unit 11 (Step S201). This log is a log of accesses to a Web server, in the same manner as a log for training, and includes at least "source IP", "date and time", and "request".

The analyzing unit 13b acquires the profile from the profile storage unit 14a (Step S202). The analyzing unit 13b then extracts various parameters from the log for analysis (Step S203). The log for analysis having its parameters extracted is stored in the analysis-completed log storage unit 14b.

The analyzing unit 13b then abstracts the parameter value into a sequence of character classes, e.g., a sequence of an alphabet class and a number class (Step S204). The analyzing unit 13b then compares the character class sequence that is the abstraction result with those in the profile (Step S205). Available as criteria for comparing the similarity, not only the exact match between the character class sequences may be used, but it is also possible to compare a ratio of the common part or the length of the longest common subsequence (LCS) between the character class sequences with the length of the character class sequence.

If there is no matching [path: parameter key] pair in the profile, or if it is determined that the similarity between the character class sequence is low, in the similarity comparing process, the analyzing unit 13b updates the information stored as the re-learning requirement determining information in the re-learning requirement determining information storage unit 14c, using the set of [source IP, date and time, path, parameter key] included in the entry currently being processed (Step S206).

The analyzing unit 13b then determines whether the condition for ending the analyzing process has been satisfied (Step S207). As a result of this process, if it is determined that the condition for ending has not been satisfied yet (NO at Step S207), the analyzing unit 13b shifts the control to the process at Step S203. If it is determined that the condition for ending has been satisfied (YES at Step S207), the analyzing unit 13b outputs the determination result acquired by the similarity comparison, e.g., whether the access has been determined as an "attack" or "non-attack", for example (Step S208).

The sequence of the re-learning requirement determining process performed by the log analysis apparatus will now be explained with reference to FIG. 13. As illustrated in FIG. 13, the re-learning requirement determining unit 13c acquires the re-learning requirement determining information (Step S301). Specifically, the re-learning requirement determining unit 13c acquires the re-learning requirement determining information updated during the analyzing process (acquires the sets of [source IP, date and time, path, parameter key] of the requests including parameter values not found in the profile, or with a similarity lower than the threshold) from the re-learning requirement determining information storage unit 14c.

In order to check that such requests are being transmitted continuously from many users, the re-learning requirement determining unit 13c performs a process of taking a tally of the re-learning requirement determining information (Step S302). Specifically, the re-learning requirement determining unit 13c takes a tally of the number of different source IPs for each of the [path: parameter key] pair included in the re-learning requirement determining information corresponding to a certain time period.

The re-learning requirement determining unit 13c then determines whether the number of different source IPs is equal to or higher than a threshold, and, if the number of different source IPs is equal to or higher than the threshold, determines that re-learning is required (Step S303). As a result of this process, if the number of different source IPs is not equal to or higher than the threshold, the re-learning requirement determining unit 13c determines that the re-learning is required (NO at Step S303), and ends the process as it is. If the number of different source IPs is equal to or higher than the threshold, the re-learning requirement determining unit 13c determines that the re-learning is required (YES at Step S303), and instructs the learning unit 13a to carry out the re-learning (Step S304).

[Advantageous Effects Achieved by First Embodiment]

In the manner described above, the log analysis apparatus 10 according to the first embodiment extracts parameters from an access log pertaining to requests issued from user terminals to a server, learns the appearance frequencies of the parameters, and stores the learning result in the profile storage unit 14a as a profile. The log analysis apparatus 10 then extracts parameters from an access log under analysis, and acquires the similarity by comparing the parameters with the parameters included in the profile stored in the profile storage unit 14a, and, if the similarity is lower than a threshold, determines that an access in the access log under analysis as an attack. Among the entries of requests included in the access log under analysis, for those with a parameter finding no match in "path: parameter key" included in the profile, or a parameter with a similarity lower than the threshold, the log analysis apparatus 10 takes a tally of the number of different requesting user terminals having issued such requests, for each of such parameters, and, if there is any parameter for which the number of such different user terminals is equal to or higher than a threshold, determines to perform re-learning of the parameter. Therefore, the log analysis apparatus 10 according to the first embodiment can reduce the burdens of the operations, and can detect unknown attacks highly accurately.

In other words, because the log analysis apparatus 10 according to the first embodiment is capable of re-learning, the log analysis apparatus 10 can follow a specification change of the Web application. Furthermore, because the log analysis apparatus 10 according to the first embodiment has a function for determining whether re-learning is required, the operator does not need to make the determination as to whether to carry out the re-learning, and therefore, the operation can be automated. Hence, it is possible to reduce the burdens of the operations, and to detect unknown attacks highly accurately. Furthermore, the log analysis apparatus 10 according to the first embodiment keeps the actual appearance count as a profile, instead of statistical information, so that the re-learning process can be performed merely with additions.

Second Embodiment

Explained in the first embodiment described above is an example in which a "character class sequence" and an "appearance count" are stored as a profile in a manner associated with a "path: parameter key" pair, but is also possible to abstract "path" from "path: parameter key".

Depending on Web applications, paths are dynamically generated. Therefore, if the access log is analyzed assuming that the paths are static, analyses cannot be sometimes performed correctly. Therefore, in a second embodiment, the paths are abstracted to allow the analyses to be performed correctly even when there are some paths that are dynamically generated. Explanations are omitted for the configurations and the process that are the same as those according to the first embodiment.

Figure 14:
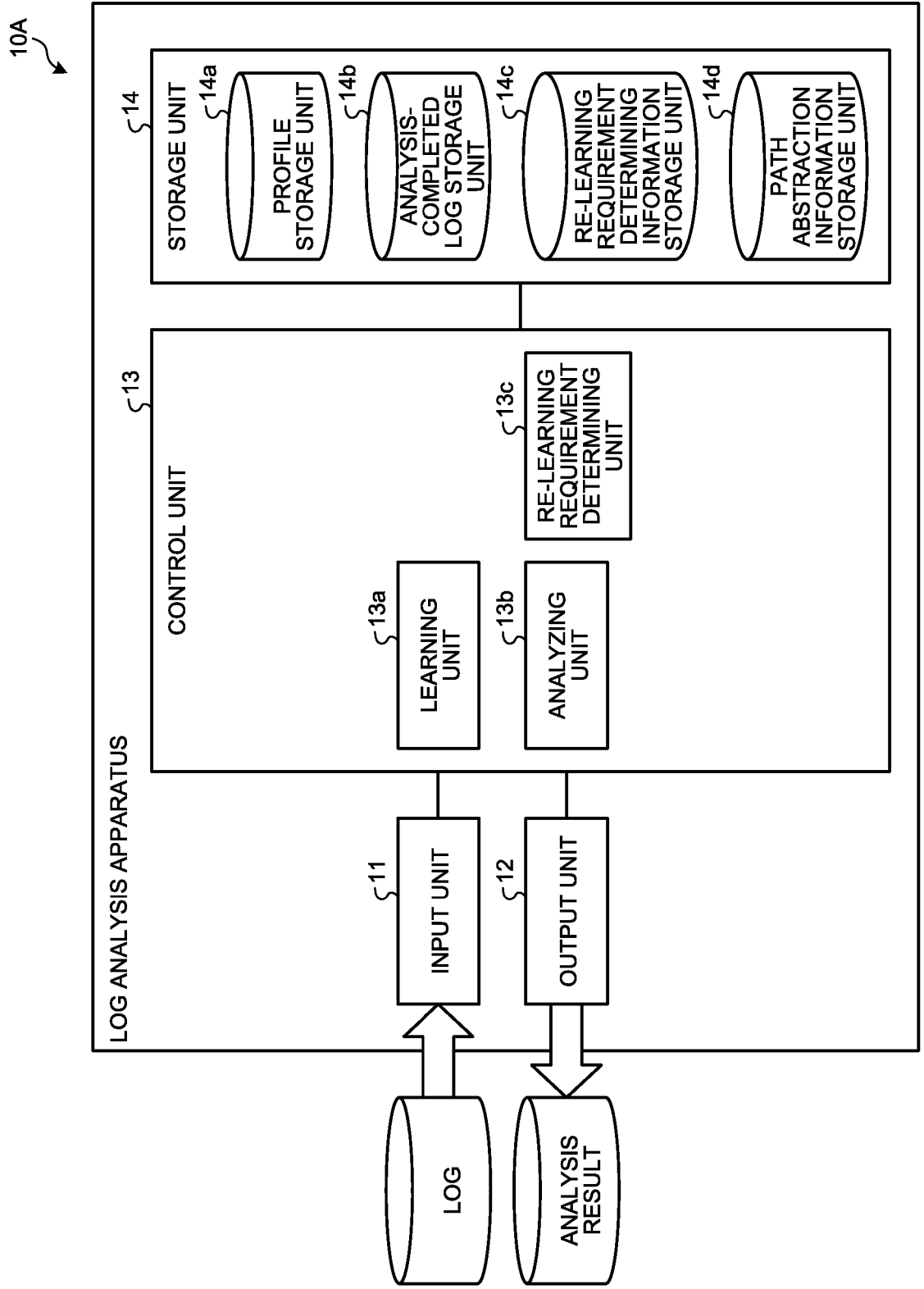
FIG. 14 is a schematic illustrating a general configuration of the log analysis apparatus according to a second embodiment.

To begin with, a configuration of a log analysis apparatus 10A according to the second embodiment will be explained with reference to FIG. 14. FIG. 14 is a schematic illustrating a general configuration of the log analysis apparatus according to the second embodiment. As illustrated in FIG. 14, the log analysis apparatus 10A according to the second embodiment is different from the log analysis apparatus 10 illustrated in FIG. 1 in having a path abstraction information storage unit 14d.

The path abstraction information storage unit 14d stores therein a regular expression of paths to be extracted and path settings after the abstraction, as path abstraction information. For example, when paths having a three-digit number following "/dynamic/path/foo" are to be abstracted as _NUM the path abstraction information storage unit 14d stores therein the following setting. Regular expression of paths to be abstracted: "/dynamic/path/foo[0-9]{3}"Path setting after abstraction: "/dynamdc/path/foo_NUM"

After the processing of the entire log for training has been completed, and the profile has been. updated, the learning unit 13a extracts a record of a path to be abstracted. Specifically, the learning unit 13a extracts a record including a path part that matches the regular expression of the paths to be abstracted.

Figure 15:
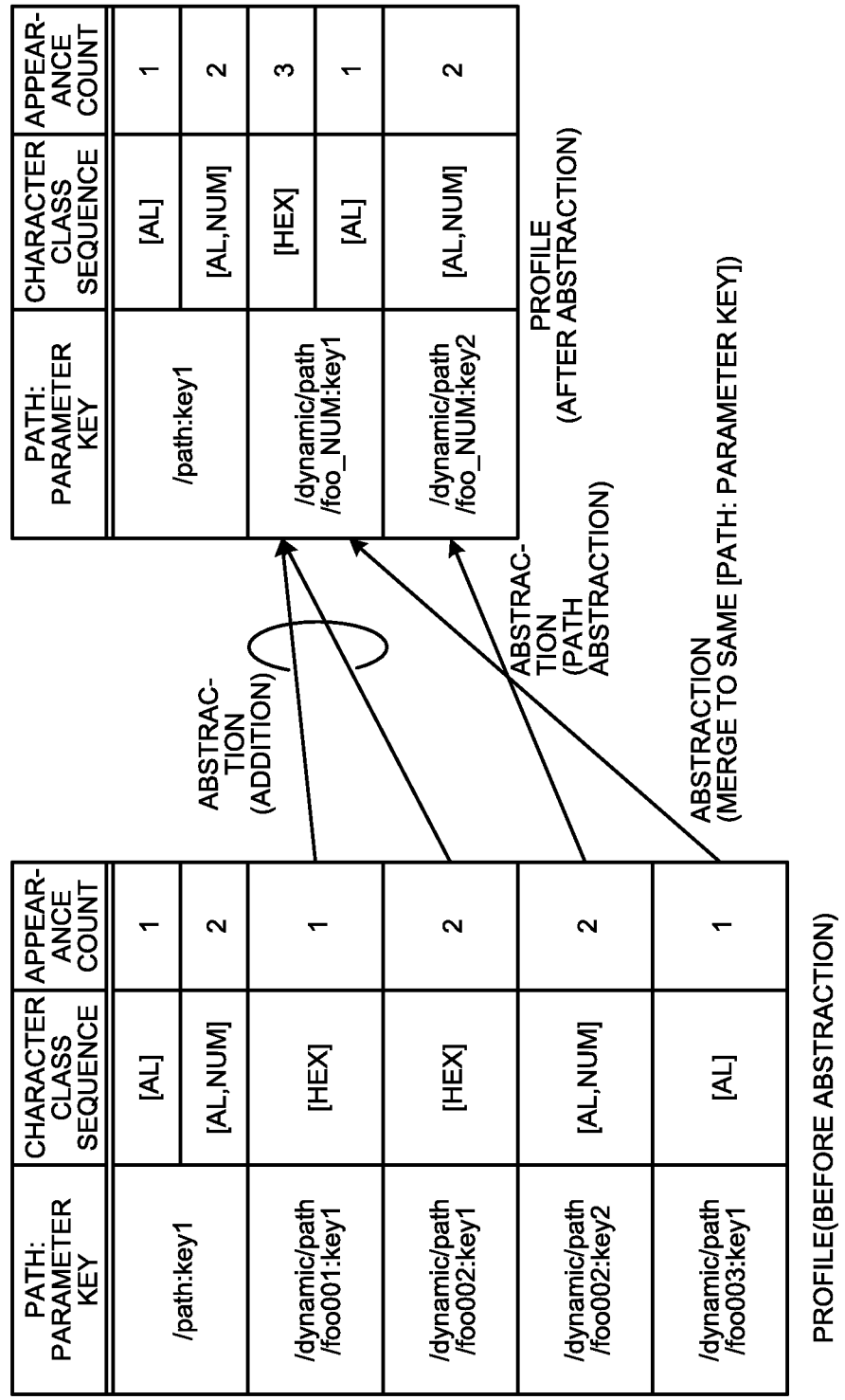
FIG. 15 is a schematic for illustrating an example of a path abstracting process.

The learning unit 13a then performs a path abstracting process for abstracting the path included in the extracted record. An example of the path abstracting process will now be explained with reference to FIG. 15. FIG. 15 is a schematic for illustrating an example of the path abstracting process. As illustrated in FIG. 15, for the paths to be abstracted, the learning unit 13a merges the information of [path: parameter key] pairs to a [path after abstraction: parameter key] pair included in the profile. The learning unit 13a then updates the appearance count corresponding to the merged [path: parameter key] pair, by adding the information before the abstraction. The learning unit 13a also merges the records having been abstracted into the same [path: parameter key] pair. At the time of re-learning, too, the learning unit 13a also performs the path abstraction.

After the analyzing unit 13b extracts parameters in the parameter extraction process, the analyzing unit 13b refers to the path abstraction information, and abstracts the paths matching the regular expression of the paths to be abstracted.

Figure 16:
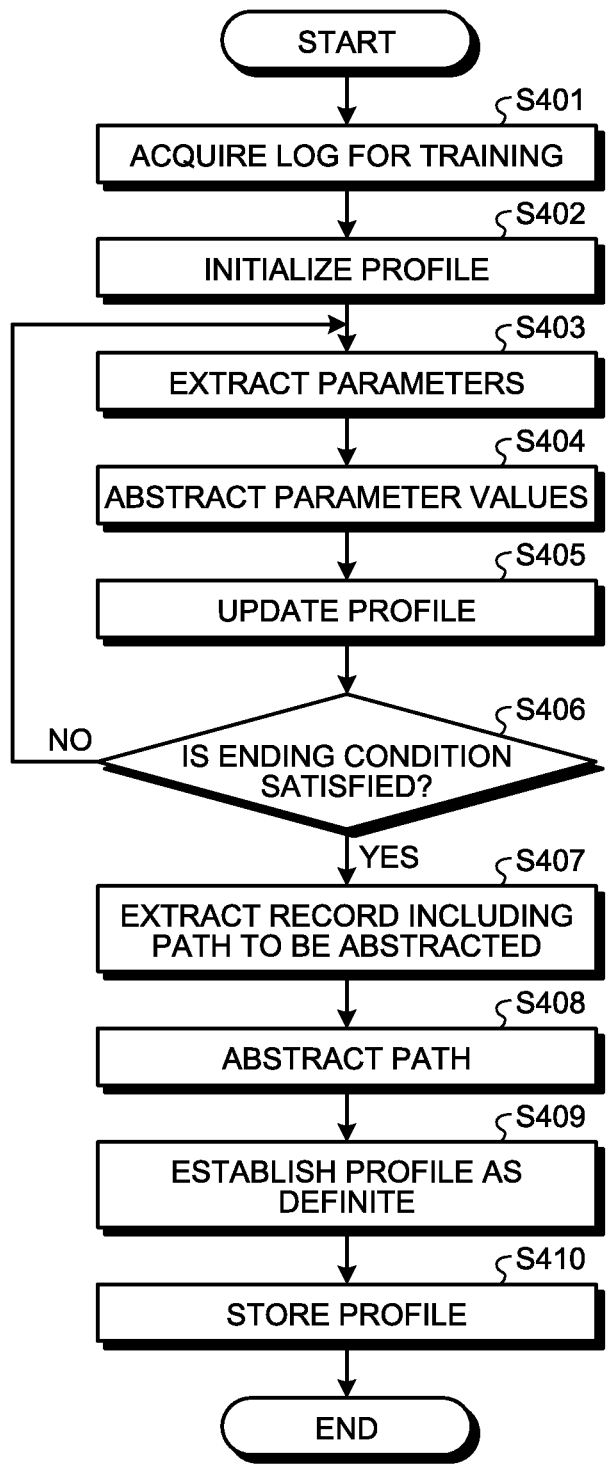
FIG. 16 is a flowchart illustrating the sequence of a learning process performed by a log analysis apparatus according to a second embodiment.

The sequence of a process performed by the log analysis apparatus 10A according to the second embodiment will now be explained with reference to FIG. 16. FIG. 16 is a flowchart illustrating the sequence of a learning process performed by the log analysis apparatus according to the second embodiment.

As illustrated in FIG. 16, the learning unit 13a included in the log analysis apparatus 10A acquires a log for training via the input unit 11 (Step S401), and initializes the profile with null data (Step S402). The learning unit 13a then extracts various parameters from the log for training (Step S403). The learning unit 13a then extracts parameters from the access log, and abstracts the extracted parameters (Step S404). The learning unit 13a then learns the appearance frequencies of the abstracted parameters, and updates the profile (Step S405).

The learning unit 13a then determines whether the condition for ending the learning process has been satisfied (Step S406). As a result of this, if the learning unit 13a determines that the condition for ending has not been satisfied yet (NO at Step S406), the control is returned to the process at Step S403. If it is determined that the condition for ending has been satisfied (YES at Step S406), the learning unit 13a extracts a record including a path for which the path abstraction is to be applied, from the profile (Step S407).

The learning unit 13a then performs the path abstracting process for abstracting the path included in the extracted record (Step S408). The learning unit 13a then establishes the profile as definite (Step S409), and stores the profile established as definite in the profile storage unit 14a (Step S410).

[Advantageous Effects Achieved by Second Embodiment]

In the manner described above, the log analysis apparatus 10A according to the second embodiment performs a path abstraction. Therefore, even when the Web application has some paths that are dynamically generated, the analysis can be performed correctly.

Third Embodiment

Explained in the first embodiment described above is an example in which following steps are performed: parameters are extracted from the access log under analysis; a similarity is then acquired by comparing the parameters with the parameters included in the profile; and, if the similarity is lower than a threshold, the access in the access log under analysis is determined as an attack. It is, however, possible to extract the common part of the parameters included in the accesses having been determined as attacks, and to generate an attack pattern based on the common part. For example, it is possible to generate an attack pattern from the parameters determined as attacks in the analysis, and to apply the attack pattern to an appliance such as a WAF as a signature, so that similar attacks can be blocked thereby.

To address this point, explained now in a third embodiment is an example in which the common part of the parameters included in an access determined to be an attack is extracted, and an attack pattern is generated based on the matching part. Explanations are omitted for the configurations and the process that are the same as those according to the first embodiment.

Figure 17:
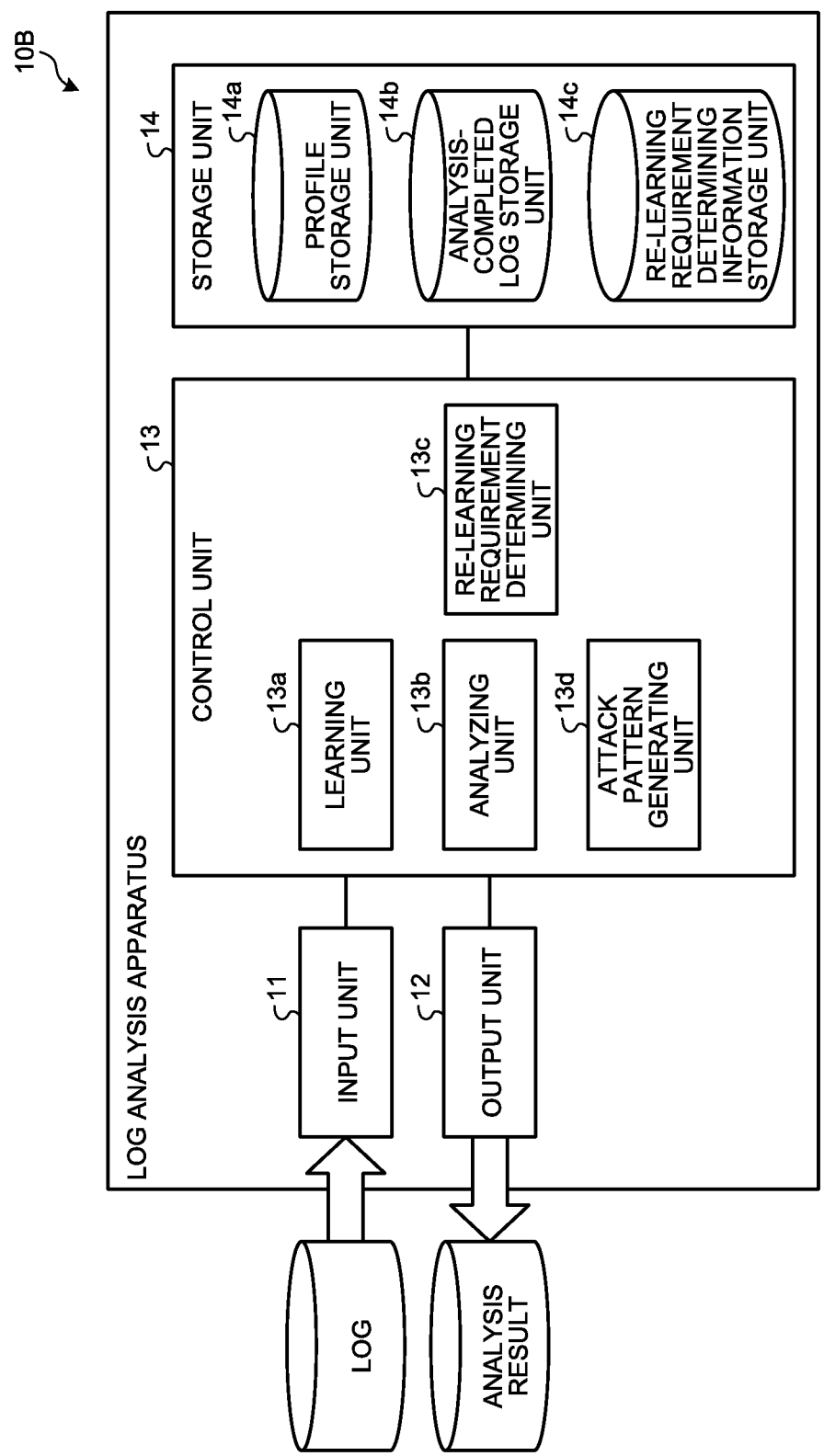
FIG. 17 is a schematic illustrating a general configuration of a log analysis apparatus according to a third embodiment.

A configuration of a log analysis apparatus 10B according to the third embodiment will now be explained with reference to FIG. 17. FIG. 17 is a schematic illustrating a general configuration of the log analysis apparatus according to the third embodiment. As illustrated in FIG. 17, the log analysis apparatus 10B according to the third embodiment is different from the log analysis apparatus 10 illustrated in FIG. 1 in having an attack pattern generating unit 13d.

The attack pattern generating unit 13d extracts a common part of the parameters included in the accesses having been determined as attacks, and generates an attack pattern based on the common part. For example, the attack pattern generating unit 13d acquires the analysis result from the analyzing unit 13b, and acquires the parameters included in requests having been determined as attacks. The attack pattern generating unit 13d then extracts the common part from the parameters.

For example, (i) denoting a set of parameters as $P=\{p_1, p_2, \ldots, p_n\}$, the attack pattern generating unit 13d acquires a common part between the first element $p_1$ and each of the elements of P other than $p_1$, and establishes the common part between $p_1$ and the element with the longest common part (denoting this element as $p_i$) as C1. If the length of C1 is equal to or longer than a threshold, the attack pattern generating unit 13d keeps C1 as a common part, and deletes $p_1$ and $p_i$ from. P. If the length of C1 is shorter than the threshold, the attack pattern generating unit 13d determines that $p_1$ does not have any common part with the elements, discards C1, and deletes only $p_1$ from P.

The attack pattern generating unit 13d then repeats the step (i) on P having been updated at the previous step (i), and extracts common parts C1, C2, . . . . The common parts may be extracted using any other technique. For example, it is possible to measure the similarity between two character strings as an edit distance, to cluster the parameter set based on the similarities, and to extract a common part from each of the clusters.

The attack pattern generating unit 13d then formulates a regular expression by replacing the elements other than the common part by "*", based on the common parts C1, C2, . . . extracted by the steps described above, and establishes the regular expression as an attack pattern. For example, the attack pattern generating unit 13d generates, from parameter values "abc##ATTACK$$" and "12##ATTACK$$xyz" having a common part "##ATTACK$$", a regular expression "*##ATTACK$$*" as an attack pattern, and outputs the generated attack pattern.

Figure 18:
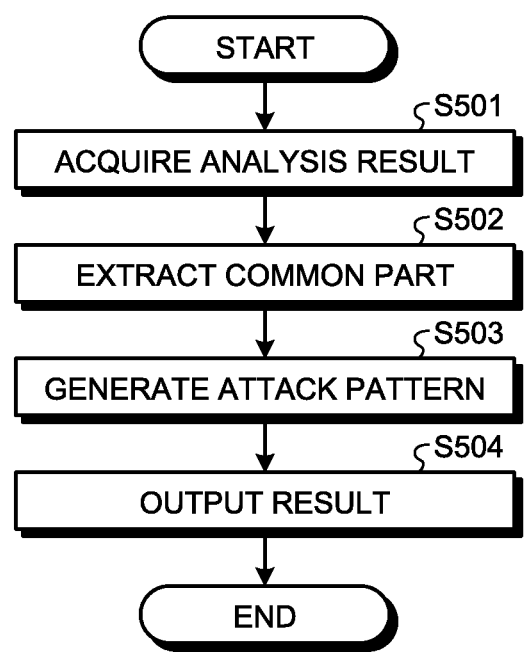
FIG. 18 is a flowchart illustrating the sequence of an attack pattern generating process performed by the log analysis apparatus according to the third embodiment.

The sequence of a process performed by the log analysis apparatus 10B according to the third embodiment will now be explained with reference to FIG. 18. FIG. 18 is a flowchart illustrating the sequence of an attack pattern generating process performed by the log analysis apparatus according to the third embodiment.

As illustrated in FIG. 18, the attack pattern generating unit 13d included in the log analysis apparatus 10B acquires the analysis result from the analyzing unit 13b (Step S501). The attack pattern generating unit 13d then extracts a common part from the parameters (Step S502).

The attack pattern generating unit 13d then generates an attack pattern (Step S503). For example, the attack pattern generating unit 13d formulates a regular expression by replacing the elements other than the common part with "*", based on the common parts C1, C2, . . . , and establishes the regular expression as an attack pattern. The attack pattern generating unit 13d then outputs the generated attack pattern (Step S504).

[Advantageous Effects Achieved by Third Embodiment]

In the manner described above, the log analysis apparatus 10B according to the third embodiment extracts the common part of the parameters in the accesses having been determined as attacks, and generates an attack pattern based on the common part. Therefore, by applying the generated attack pattern as a signature of an appliance such as a WAF, it is possible to block similar attacks.

[Fourth Embodiment]

Explained in the third embodiment above is an example in which the common part of the parameters are extracted from the accesses having been determined as attacks, and an attack pattern is generated based on the common part. In order to prevent redundant generations of attack patterns similar to an attack pattern having been already generated, it is possible to determine whether a parameter included in an access determined as an attack matches an attack pattern having been already generated, and, if the parameter is determined to match the attack pattern, to delete the parameter included in the access determined as an attack.

Therefore, explained in a fourth embodiment below is an example in which it is determined whether a parameter included in an access determined as an attack matches an attack pattern having been already generated, and, if the parameter is determined to match, the parameter included in the access determined as an attack is deleted. Explanations are omitted for the configurations and the process that are the same as the third embodiment.

Figure 19:
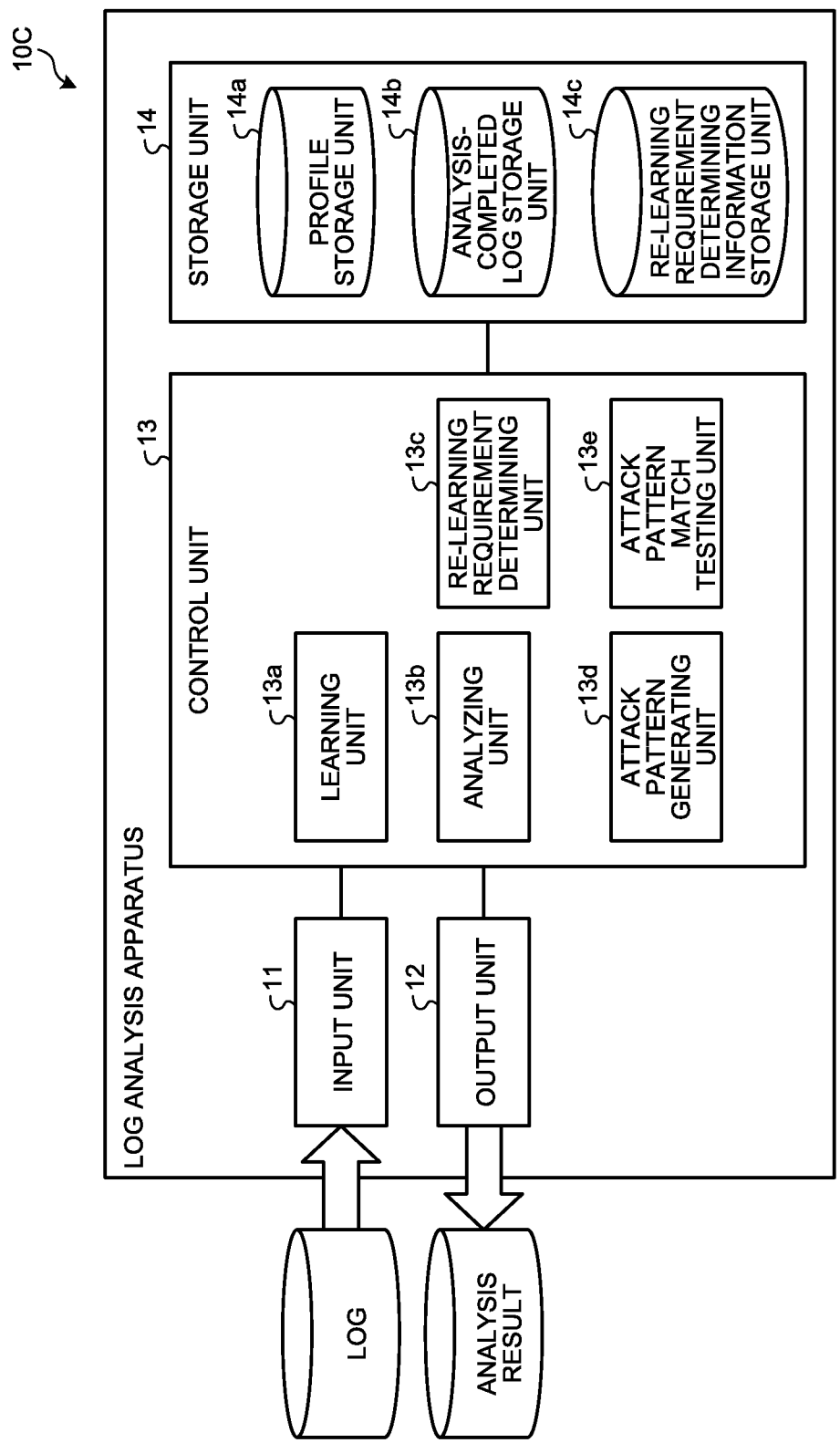
FIG. 19 is a schematic illustrating a general configuration of a log analysis apparatus according to a fourth embodiment.

A configuration of a log analysis apparatus 10C according to the fourth embodiment will now be explained with reference to FIG. 19. FIG. 19 is a schematic illustrating a general configuration of a log analysis apparatus according to the fourth embodiment. As illustrated in FIG. 19, the log analysis apparatus 100 according to the fourth embodiment is different from the log analysis apparatus 10B illustrated in FIG. 17 in having an attack pattern match testing unit 13e.

The attack pattern match testing unit 13e determines whether a parameter included in an access determined by the analyzing unit 13b as an attack matches the attack pattern having been already generated, and, if the parameter is determined to match, deletes the parameter of the access determined as an attack.

In other words, in order to prevent redundant generations of attack patterns similar to that having already been generated by the attack pattern generating unit 13d, the attack pattern match testing unit 13e performs a matching test between a parameter value included in the analysis result that is determined as an attack by the analyzing unit 13b, and the attack pattern having been already generated, passes only the not-matching parameter to the attack pattern generating unit 13d, and causes the attack pattern generating unit 13d to perform the attack pattern generating process.

[Advantageous Effects Achieved by Fourth Embodiment]

In the manner described above, the log analysis apparatus 10C according to the fourth embodiment determines whether a parameter included in an access determined as an attack matches an attack pattern having been already generated, and, if the parameter is determined to match, deletes the parameter in the access determined as an attack. Therefore, it is possible to prevent similar attack patterns from being generated redundantly.

[System Configuration and Like]

Furthermore, the units included in the apparatuses illustrated in the drawings are merely functional and conceptual representations, and do not necessarily need to be configured physically in the manner illustrated. In other words, the specific configurations in which these apparatuses are distributed or integrated are not limited to those illustrated in the drawings, and the entire or any part of these apparatuses may be configured to be distributed to or integrated into any units functionally or physically, depending on various loads and conditions of use. Furthermore, the entire or any part of the processing functions performed in the apparatus may be implemented as a central processing unit (CPU) and a computer program parsed and executed by the CPU, or as a piece of hardware using wired logics. For example, the learning unit 13a and the analyzing unit 13b may be integrated.

Among the processes explained in the embodiment, the entire or any part of the processes explained to be performed automatically may be performed manually, or the entire or any part of the processes explained to be performed manually may be performed automatically. In addition, the processing procedures, the control procedures, specific names, and information including various data and parameters depicted in the text or the drawings may be changed in any way, unless specified otherwise.

[Computer Program]

Furthermore, it is also possible to create a computer program by describing the processes performed by the log analysis apparatus explained in the embodiment described above, in a computer-executable language. For example, it possible to create a log analysis program by describing the process performed by the log analysis apparatus 10 according to the embodiment in a computer-executable language. In such a case, the same advantageous effects achieved by the embodiment described above can be achieved by causing a computer to execute the log analysis program. Furthermore, it is also possible to implement the processes that are the same as those according to the embodiments by recording such a log analysis program in a computer-readable recording medium, and by causing a computer to read and to execute the log analysis program recorded in the recording medium.

Figure 20:
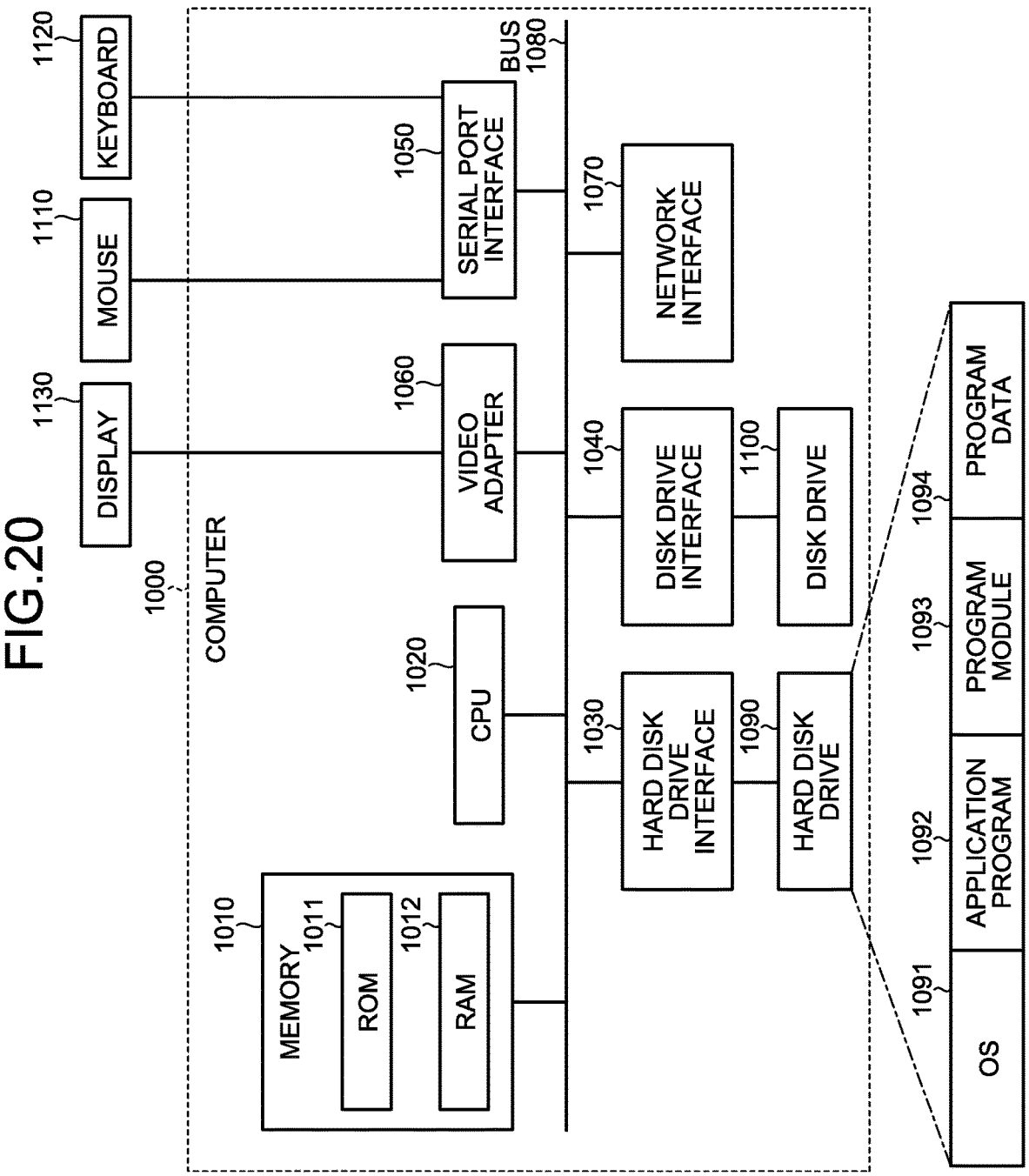
FIG. 20 is a schematic illustrating a computer executing a log analysis program.

FIG. 20 is a schematic illustrating a computer 1000 executing the log analysis program. As illustrated in FIG. 20, the computer 1000 includes, for example, a memory 1010, a CPU 1020, a hard disk drive interface 1030, a disk drive interface 1040, a serial port interface 1050, a video adapter 1060, and a network interface 1070, and these units are connected by a bus 1080.

The memory 1010 includes, as illustrated in FIG. 20, a read-only memory (ROM) 1011 and a RAM 1012. The ROM 1011 stores therein, for example, a boot program such as the basic input/output system (BIOS). The hard disk drive interface 1030 is connected to a hard disk drive 1090, as illustrated in FIG. 20. The disk drive interface 1040 is connected to a disk drive 1100, as illustrated in FIG. 20. To the disk drive 1100, a removable storage medium such as a magnetic disk or an optical disc is inserted. The serial port interface 1050 is connected to a mouse 1110 and a keyboard 1120, for example, as illustrated in FIG. 20. The video adapter 1060 is connected to a display 1130, for example, as illustrated in FIG. 20.

As illustrated in FIG. 20, the hard disk drive 1090 stores therein, for example, an operating system (OS) 1091, an application program 1092, a program module 1093, and program data 1094. In other words, the log analysis program described above is stored in the hard disk drive 1090, for example, as a program module describing commands executed by the computer 1000.

The various types of data explained in the embodiments above are stored in the memory 1010 or the hard disk drive 1090, for example, as program data. The CPU 1020 then reads the program module 1093 or the program data 1094 stored in the memory 1010 or the hard disk drive 1090 onto the RAM 1012, as required, and executes various processing procedures.

The program module 1093 or the program data. 1094 pertaining to the log analysis program may be stored in a removable storage medium, for example, without limitation to the example being stored in the hard disk drive 1090, and may be read by the CPU 1020 via a disk drive or the like. Alternatively, the program module 1093 or the program data 1094 pertaining to the log analysis program may also be stored in another computer that is connected over a network (e.g., a local area network (LAN) or a wide area network (WAN)), and may be read by the CPU 1020 via the network interface 1070.

REFERENCE SIGNS LIST 10, 10A, 10B, 10C log analysis apparatus
11 input unit
12 output unit
13 control unit
13a learning unit
13b analyzing unit
13c re-learning requirement determining unit
13d attack pattern generating unit
13e attack pattern match testing unit
14 storage unit
14a profile storage unit
14b analysis-completed log storage unit
14c re-learning requirement determining information storage unit

The invention claimed is:

1. A log analysis apparatus comprising:
a memory; and
a processor coupled to the memory, the processor configured to execute a process comprising:
firstly extracting a parameter from an access log pertaining to a request issued from a user terminal to a server, learning an appearance frequency of the parameter, and storing a learning result in the memory as a profile;
secondly extracting a parameter from an access log under analysis, acquiring a similarity by comparing the parameter with the parameter included in the profile stored in the memory, and firstly determining an access in the access log under analysis as an attack when the similarity is lower than a threshold; and
for each path and parameter key pair included in re-learning requirement determining information corresponding to a certain period, taking a tally of a number of different requesting source IPs among access logs under analysis having a similarity lower than the threshold, and secondly determining, when there is any parameter for which the number of the different source IPs is equal to or higher than a threshold, to re-learn the parameter,
wherein each path and corresponding parameter key pair are concatenated together, and
in the firstly extracting, the processor abstracts the extracted parameter by identifying an expression corresponding to one of a plurality of predefined classes for the extracted parameter, the expression to be used in the learning instead of the extracted parameter, and in the learning, the processor learns an appearance frequency of the abstracted parameter using the expression.

2. The log analysis apparatus according to claim 1, wherein the process further comprises thirdly extracting a common part of parameters included in accesses determined as attacks, and generating an attack pattern based on the common part.

3. The log analysis apparatus according to claim 1, wherein in the learning, the processor learns an appearance frequency of each parameter, and deletes a parameter with an appearance frequency equal to or lower than a predetermined threshold from the profile.

4. The log analysis apparatus according to claim 1, wherein
in the taking, the processor takes the tally of the number of the different requesting source IPs, for each parameter included in an access log including a plurality of requests that are issued consecutively within a time period, and a time interval between which is shorter than a threshold, among the access logs under analysis having a similarity lower than the threshold, and in the secondly determining the processor determines, when there is any parameter for which the number of such different source IPs is equal to or higher than a threshold, to re-learn the parameter.

5. The log analysis apparatus according to claim 2, wherein the process further comprises determining whether a parameter included in an access that is determined as an attack matches an attack pattern having been already generated, and deleting the parameter of the access determined as an attack when the parameter is determined to match.

6. A log analysis method executed by a log analysis apparatus, the log analysis method comprising:
performing a learning process by extracting a parameter from an access log pertaining to a request issued from a user terminal to a server, learning an appearance frequency of the parameter, and storing a learning result in a memory as a profile;
performing an analyzing process by extracting a parameter from an access log under analysis, acquiring a similarity by comparing the parameter with the parameter included in the profile stored in the memory, and determining an access in the access log under analysis as an attack when the similarity is lower than a threshold; and
performing a re-learning requirement determining process by, for each path and parameter key pair included in a re-learning requirement determining information corresponding to a certain time period, taking a tally of number of different requesting source IPs among access logs under analysis having a similarity lower than the threshold, and determining, when there is any parameter for which the number of the different source IPs is equal to or higher than a threshold, to re-learn the parameter,
wherein each path and corresponding parameter key pair are concatenated together, and
in performing the learning process, the extracted parameter is abstracted by identifying an expression corresponding to one of a plurality of predefined classes for the extracted parameter, the expression to be used in the learning process instead of the extracted parameter, and an appearance frequency of the abstracted parameter using the expression.

7. A non-transitory computer-readable recording medium having stored therein a log analysis program that causes a computer to execute a process comprising:
extracting a parameter from an access log pertaining to a request issued from a user terminal to a server, learning an appearance frequency of the parameter, and storing a learning result in a memory as a profile;
extracting a parameter from an access log under analysis, acquiring a similarity by comparing the parameter with the parameter included in the profile stored in the memory, and determining an access in the access log under analysis as an attack when the similarity is lower than a threshold; and
for each path and parameter key pair included in a re-learning requirement determining information corresponding to a certain time period, taking a tally of number of different requesting source IPs among access logs under analysis having a similarity lower than the threshold, and determining, when there is any parameter for which the number of the different source IPs is equal to or higher than a threshold, to re-learn the parameter, wherein each path and corresponding parameter key pair are concatenated together, and in performing extracting the parameter from the access log, the extracted parameter is abstracted by identifying an expression corresponding to one of a plurality of predefined classes for the extracted parameter, the expression to be used in the learning instead of the extracted parameter, and an appearance frequency of the abstracted parameter using the expression is learned.

8. The log analysis apparatus according to claim 1, wherein the predefined classes include alphabets, hexidecimals, numbers, and symbols.

9. The log analysis apparatus according to claim 1, wherein each of the predefined classes includes a corresponding priority, and the processor abstracts the extracted parameter based, at least in part, on the corresponding priority.

10. The log analysis apparatus according to claim 9, wherein in a case that the extracted parameter is able to correspond to two predefined classes, the processor identifies the expression as an expression corresponding to a predefined class of the two predefined classes having a highest priority.

11. The log analysis apparatus according to claim 1, wherein the processor abstracts the extracted parameter based, at least in part, on a length of the extracted parameter.

12. The log analysis method according to claim 6, wherein the predefined classes include alphabets, hexidecimals, numbers, and symbols.

13. The log analysis method according to claim 6, wherein each of the predefined classes includes a corresponding priority, and the extracted parameter is abstracted based, at least in part, on the corresponding priority.

14. The log analysis method according to claim 13, wherein in a case that the extracted parameter is able to correspond to two predefined classes, the expression corresponding to an expression of a predefined class of the two predefined classes having a highest priority is used.

15. The log analysis apparatus according to claim 1, wherein the extracted parameter is abstracted based, at least in part, on a length of the extracted parameter.

16. The non-transitory computer-readable recoding medium according to claim 7, wherein the predefined classes include alphabets, hexidecimals, numbers, and symbols.

17. The non-transitory computer-readable recoding medium according to claim 7, wherein each of the predefined classes includes a corresponding priority, and the extracted parameter is abstracted based, at least in part, on the corresponding priority.

18. The non-transitory computer-readable recoding medium according to claim 17, wherein in a case that the extracted parameter is able to correspond to two predefined classes, the extracted parameter is abstracted by identifying the expression as an expression corresponding to a predefined class of the two predefined classes having a highest priority.

19. The non-transitory computer-readable recoding medium according to claim 7, wherein the extracted parameter is abstracted based, at least in part, on a length of the extracted parameter.

* * * * *